(12) United States Patent
Bertin et al.

(10) Patent No.: US 12,051,128 B2
(45) Date of Patent: Jul. 30, 2024

(54) METHOD FOR NEGOTIATING A CONTRACT BETWEEN TWO PARTIES IN A TELECOMMUNICATIONS NETWORK AND DEVICES IMPLEMENTING SAID METHOD

(71) Applicant: Orange, Issy-les-Moulineaux (FR)

(72) Inventors: Emmanuel Bertin, Châtillon (FR); Julien Hatin, Châtillon (FR); Julien Zimmermann, Châtillon (FR); Baptiste Hemery, Châtillon (FR); Fabrice Jeanne, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 243 days.

(21) Appl. No.: 17/598,516

(22) PCT Filed: Mar. 27, 2020

(86) PCT No.: PCT/EP2020/058810
§ 371 (c)(1),
(2) Date: Sep. 27, 2021

(87) PCT Pub. No.: WO2020/193773
PCT Pub. Date: Oct. 1, 2020

(65) Prior Publication Data
US 2022/0180461 A1 Jun. 9, 2022

(30) Foreign Application Priority Data

Mar. 28, 2019 (FR) .................................... 1903298

(51) Int. Cl.
*G06Q 50/18* (2012.01)
(52) U.S. Cl.
CPC ................... *G06Q 50/188* (2013.01)

(58) Field of Classification Search
None
See application file for complete search history.

(56) References Cited

U.S. PATENT DOCUMENTS

| 2017/0300627 A1* | 10/2017 | Giordano | G06F 21/6245 |
| 2018/0300741 A1* | 10/2018 | Leonard | G06Q 30/08 |

(Continued)

OTHER PUBLICATIONS

"Creating a Contract with a smart contract"; Kseniua Lifanova; Mar. 13, 2019 (Year: 2019).*

(Continued)

*Primary Examiner* — Dennis W Ruhl
(74) *Attorney, Agent, or Firm* — Knobbe, Martens, Olson & Bear, LLP

(57) ABSTRACT

A method is described for negotiating a contract between two parties in a telecommunications network, as well as devices implementing the method. The method includes distributing, by a first party, a smart contract comprising: a subscription method allowing a second party to distribute a transaction for subscribing to the contract proposal, a method for generating a personalised contract between the parties and requesting their registration in the blockchain, the personalised contract being generated on the basis of parameters included in the transaction, executing the subscription method by a terminal of the second party, the execution triggering the distribution of a transaction comprising parameters representing the acceptance of the contract proposal by the second party, and executing, by a mining device, the method for generating a personalised contract with these parameters.

14 Claims, 5 Drawing Sheets

(56) References Cited

U.S. PATENT DOCUMENTS

2018/0314809 A1    11/2018    Mintz et al.
2019/0164157 A1*    5/2019    Balaraman ......... G06Q 20/3823
2019/0385215 A1*  12/2019    Ferenczi ................ G06Q 20/12
2020/0118092 A1*    4/2020    Gauvreau ............. H04L 9/0637

OTHER PUBLICATIONS

"An Introduction to Smart Contracts and Their Potential and Inherent Limitations"; Harvard Law School Forum on Corporate Governance (Year: 2018).*
International Search Report and Written Opinion dated Apr. 20, 2020 for Application No. PCT/EP2020/058810.
Jackson Ng. "Creating Smart Contracts with Smart Contract", medium.com, Jul. 23, 2018 (Jul. 23, 2018), Retrieved from the Internet: https ://web.arc hi ve.org/web/20180805140054/https:// medium.com/coinmonks/creating-smart-contracts-with-smart-contract-d54e2 Id26e00 [retrieved on Nov. 8, 2019].

* cited by examiner

METHOD FOR NEGOTIATING A CONTRACT BETWEEN TWO PARTIES IN A TELECOMMUNICATIONS NETWORK AND DEVICES IMPLEMENTING SAID METHOD

RELATED APPLICATIONS

This application is the U.S. National Phase of Application No. PCT/EP2020/058810 entitled "METHOD FOR NEGOTIATING A CONTRACT BETWEEN TWO PARTIES IN A TELECOMMUNICATIONS NETWORK AND DEVICES IMPLEMENTING SAID METHOD" and filed Mar. 27, 2020, which claims the benefit of French Patent Application No. 1903298, filed Mar. 28, 2019, each of which is incorporated by reference in its entirety.

PRIOR ART

The invention relates to the general field of telecommunications networks, and more specifically to the blockchain technology.

As indicated in the document (https://fr.wikipedia.org/wiki/Blockchain), it is recalled that "the blockchain technology is a technology for storing and transmitting information without a control member. Technically, it is a distributed database whose information sent by the users and the links internal to the base are verified and grouped at regular time intervals in blocks, the whole being secured by cryptography, and thus forming a chain. By extension, a blockchain is a distributed database that manages a list of records protected against forgery or modification by the storage nodes; it is therefore a distributed and secure register of all transactions performed since the start of the distributed system".

This technology is used in particular as a register to record crypto-currency transactions.

The use of the blockchain technology to record contracts has been envisaged. In this context, the use of a blockchain is particularly advantageous because it ensures that a contract recorded in the chain could not be forged.

The invention proposes to extend the use of the blockchain technology to the phase of developing and negotiating the contracts.

It can in particular be implemented in any blockchain offering a mechanism known to those skilled in the art under the name "Smart Contract", in particular and without limitation, in the Ethereum blockchain (registered trademark).

DISCLOSURE OF THE INVENTION

More specifically, according to a first aspect, the invention proposes a method for broadcasting, in a telecommunications network, a contract proposal proposed by a first party, this method including:
a step of generating a smart contract including:
the address of a register including a public key of the first party in a blockchain;
data representative of the terms of the contract proposal;
a subscription method allowing at least a second party to broadcast a transaction in the network in order to subscribe to the contract proposal;
a contract generation method configured to generate a personalized contract between the first party and a second party and to request the recording of this personalized contract in the blockchain, this personalized contract being generated from parameters comprised in the transaction and representative of a willingness of said second party to accept the terms of the contract proposal;
a step of signing the smart contract with a private key of the first party; and
a step of broadcasting in the network the signed smart contract to request its recording in the blockchain.

Correspondingly, the invention relates to a device for broadcasting, in a telecommunications network, a contract proposal proposed by a first party, this device including:
a module for generating a smart contract including:
the address of a register including a public key of the first party in a blockchain;
data representative of the terms of the contract proposal;
a subscription method allowing at least a second party to broadcast a transaction in said network in order to subscribe to the contract proposal;
a contract generation method configured to generate a personalized contract between the first party and one said second party and to request the recording of this personalized contract in the blockchain, this personalized contract being generated from parameters comprised in the transaction and representative of a willingness of the second party to accept the terms of the contract proposal;
a module for signing the smart contract with a private key of the first party; and
a module for broadcasting in the network the signed smart contract to request its recording in the blockchain.

According to a second aspect, the invention relates to a method for accepting a contract proposal broadcast in a telecommunications network, this method being implemented by the terminal of a user and including:
a step of obtaining a smart contract recorded in a blockchain, this smart contract including:
the address, in the blockchain, of a register including a public key of a first party owner of the contract proposal;
data representative of terms of the contract proposal;
a subscription method allowing at least a second party to broadcast a transaction in the network in order to subscribe to the contract proposal;
a contract generation method configured to generate a personalized contract between the first party and one said second party and to request the recording of the personalized contract in the blockchain, this personalized contract being generated from parameters comprised in the transaction and representative of a willingness of the second party to accept the terms of the contract proposal;
a step of obtaining parameters representative of a willingness of the user to accept the terms of the contract proposal;
a step of executing the subscription method, this execution triggering the broadcast in the network of a transaction, signed with a private key of the user, and including:
the address of a public key of the user in the blockchain; the address of the smart contract in the blockchain;
an identifier of the contract generation method; and
the aforementioned parameters.

Correspondingly, the invention relates to a device for accepting a contract proposal broadcast in a telecommunications network, this device being implemented in the terminal of a user and including:

a module for obtaining a smart contract recorded in a blockchain, this smart contract including:
  the address, in the blockchain, of a register including a public key of a first party owner of the contract proposal;
  data representative of terms of the contract proposal;
  a subscription method allowing at least a second party to broadcast a transaction in said network in order to subscribe to said contract proposal;
  a contract generation method configured to generate a personalized contract between the first party and one said second party and to request the recording of the personalized contract in the blockchain, this personalized contract being generated from parameters comprised in the transaction and representative of a willingness of the second party to accept the terms of the contract proposal;
a module for obtaining parameters representative of a willingness of the user to accept the terms of said contract proposal;
a module for executing the subscription method, this execution triggering the broadcast in the network of a transaction, signed with a private key of the user, and including:
  the address of a public key of the user in the blockchain;
  the address of the smart contract in the blockchain;
  an identifier of the contract generation method; and
  the aforementioned parameters.

The invention also relates to a method for negotiating a contract between two parties in a telecommunications network, this method including:
  the generation of a contract proposal by the first party, in the form of a smart contract including:
    the address of a register including a public key of the first party in a blockchain;
    data representative of the terms of the contract proposal;
    a subscription method allowing the second party to broadcast a transaction in the network in order to subscribe to this contract proposal;
    a contract generation method configured to generate a personalized contract between the first party and the second party and to request the recording of the personalized contract in the blockchain, this personalized contract being generated from parameters comprised in the transaction and representative of a willingness of the second party to accept the terms of the contract proposal;
  a step of signing the smart contract with a private key of the first party;
  a step of broadcasting the signed smart contract in said network to request its recording in the blockchain;
  a step of obtaining the smart contract by the second party;
  a step of obtaining parameters representative of a willingness of said second party to accept the terms of said contract proposal;
  a step of executing the subscription method by a terminal of the second party, this execution triggering the broadcast in the network of a transaction, signed with a private key of the second party, and including:
    the address of a public key of the user in the blockchain;
    the address of the smart contract in the blockchain;
    an identifier of said contract generation method; and
    the aforementioned parameters; and
  a step, implemented by a blockchain mining device, of executing the personalized contract generation method, with these parameters to generate a personalized contract between the parties, to record it in the blockchain and to rebroadcast the blockchain.

Within the meaning of the invention, the "address" of a resource in the blockchain is a pointer to a resource in the blockchain.

It is recalled that a smart contract is an autonomous computer program, which, once started, automatically executes conditions set in advance and registered in the blockchain (https://blockchainfrance.net/2016/01/28/applications-smart-contracts/). The decentralized applications dApps of the Ethereum project constitute smart contracts within the meaning of the invention.

In the invention, a transaction (in particular the transactions TR_AB and TR_AC of the detailed description) are transactions within the meaning of the blockchain technology, namely, recordings in the blockchain.

Within the meaning of the invention, a contract personalized by one party includes elements representative of the willingness of that party to accept the terms of the contract.

Thus, and in general, the invention proposes a mechanism allowing the negotiation of contracts in a network in which are recorded in a blockchain:
  a contract proposal broadcast to all the participants of the blockchain, at the initiative of a first user, owner of the contract proposal and party to the contract;
  a transaction representing the willingness of another user of the blockchain, a second party, to subscribe to the contract proposal, and
  a personalized contract generated from this contract proposal, between this first user and the second party to the contract.

The method is remarkable in that the contract proposal is recorded in the blockchain in the form of a smart contract and in that the personalized contract is generated by one method of this smart contract, following a transaction broadcast by the second party wishing to subscribe to the contract, through which this second party broadcasts to the users of the blockchain parameters representative of their willingness to accept the terms of the contract proposal.

Remarkably, the invention uses the blockchain to establish an immutable link between the contract proposal and the personalized contract. Indeed, the personalized contract is generated by the smart contract itself, which can be verified at any time by the users of the blockchain.

In accordance with the invention, and unlike the methods of the prior art, the personalized contract is, in the blockchain, the property of the smart contract (that is to say of the contract proposal) and not of the second party to the contract.

The personalized contract obtained by the invention may consist of a set of static data.

In one preferred embodiment of the invention, the personalized contract is a smart contract. This smart contract may contain a computer code configured to be executed during or after the execution of the personalized contract between the parties.

In one particular embodiment of the invention, the subscription generation method is configured to obtain conditions of accepting the contract proposal from the second party, these acceptance conditions forming part of the parameters comprised in the transaction to generate the personalized contract.

In one particular embodiment, the contract generation method can be configured to verify whether these acceptance conditions are compatible with the terms of the contract proposal before generating the specific contract.

In one embodiment, the contract proposal broadcasting method according to the invention includes a step of downloading a computer agent from a server, this agent including:
- a module for obtaining, from the first party, data representative of the terms of the contract proposal; and
- a module for generating the smart contract from these data and for broadcasting the smart contract in the network.

Correspondingly, in this embodiment, the broadcasting device according to the invention includes:
- a communication module able to download an agent from a server;
- a processing module able to install this agent in the device;
- this agent including the contract generation module, the signature module and the broadcasting module of the broadcasting device.

This agent is remarkable in that it allows assisting the user in drafting the contract proposal, and in that it carries out, in a transparent way for the user, its implementation in a smart contract and the recording of this contract in the blockchain. The Applicant has indeed observed that, in the current state of the art, the owners of data recorded in the blockchains were IT experts.

The invention on the contrary aims for a solution for negotiating online contracts that does not require knowledge in the blockchain technology.

In one embodiment of the invention, this agent further includes a module for signing the smart contract with the private key of the first party.

As a variant, the smart contract can be signed with the private key of the first party by a cryptographic module of its terminal and provided signed to the agent for broadcasting in the blockchain.

In one particular embodiment, the different steps of the contract proposal broadcasting method, of the contract proposal acceptance method and of the contract negotiation method are determined by computer program instructions.

Consequently, the invention also aims for a computer program on an information medium, this program being capable of being implemented in a computer, this program including instructions adapted to the implementation of the steps of a method as described above.

This program can use any programming language, and be in the form of source code, object code, or intermediate code between source code and object code, such as in a partially compiled form, or in any other desirable form.

The invention also aims for a computer-readable information or recording medium, and including instructions from a computer program as mentioned above.

The information or recording medium can be any entity or device capable of storing the program. For example, the medium may include a storage means, such as a ROM, for example a CD ROM or a microelectronic circuit ROM, or a magnetic recording means, for example a hard disk.

On the other hand, the information or recording medium can be a transmissible medium such as an electrical or optical signal, which can be conveyed via an electrical or optical cable, by radio or by other means. The program according to the invention can be particularly downloaded from an Internet-type network.

Alternatively, the information or recording medium can be an integrated circuit in which the program is incorporated, the circuit being adapted to execute or to be used in the execution of the method in question.

BRIEF DESCRIPTION OF THE DRAWINGS

Other characteristics and advantages of the present invention will emerge from the description given below, with reference to the appended drawings which illustrate an exemplary embodiment thereof without any limitation. In the figures.

DESCRIPTION OF THE EMBODIMENTS

Figure 1:
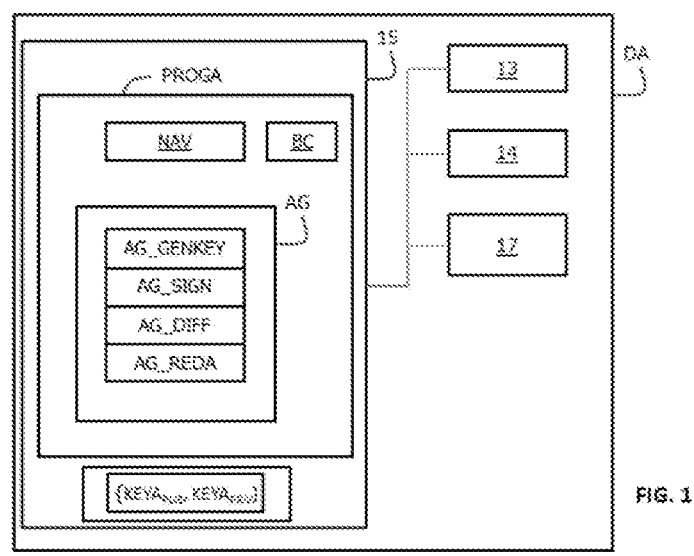
FIG. 1 represents the hardware architecture of a contract proposal broadcasting device in accordance with one particular embodiment of the invention.

FIG. 1 represents the hardware architecture of a device DA for broadcasting a contract proposal in accordance with one particular embodiment of the invention. In the embodiment described below, this device DA is integrated into the terminal TA of a user Alice.

This device DA comprises in particular a processor 13, a random access memory 14, a hard disk 15 as well as communication means 17 allowing it to communicate over a telecommunications network, in particular with terminals. These communication means include, for example, a WIFI interface, a network card, etc. depending on the nature of the network.

The hard disk 15 constitutes a recording medium in accordance with the invention, readable by the processor 13 and on which a computer program PROGA in accordance with the invention is here recorded.

In the embodiment described here, this computer program PROGA includes an Internet browser NAV and a computer agent AG downloaded from a server SRV_COMP of the network offering a contract proposal composition service.

The computer program PROGA defines functional (and here software) modules configured to implement the steps of a contract proposal broadcasting method according to the invention.

Figure 2:
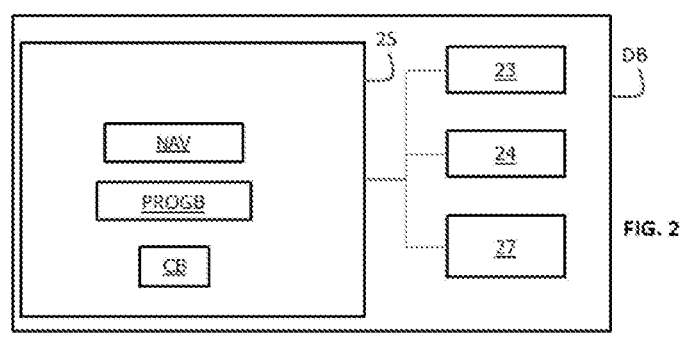
FIG. 2 represents the hardware architecture of a contract proposal acceptance device in accordance with one particular embodiment of the invention.

FIG. 2 represents the hardware architecture of a device DB for accepting a contract proposal in accordance with one particular embodiment of the invention. In the embodiment described below, this device DB is integrated into the terminal TB of a user Bob and into the terminal TC of a user Charly.

This device DB comprises in particular a processor 23, a random access memory 24, a hard disk 25 as well as communication means 27 in the telecommunications network.

The hard disk 25 constitutes a recording medium in accordance with the invention, readable by the processor 23 and on which a computer program PROGB in accordance with the invention is here recorded.

The computer program PROGB defines functional (and here software) modules configured to implement the steps of a contract proposal acceptance method according to the invention.

Figure 3:
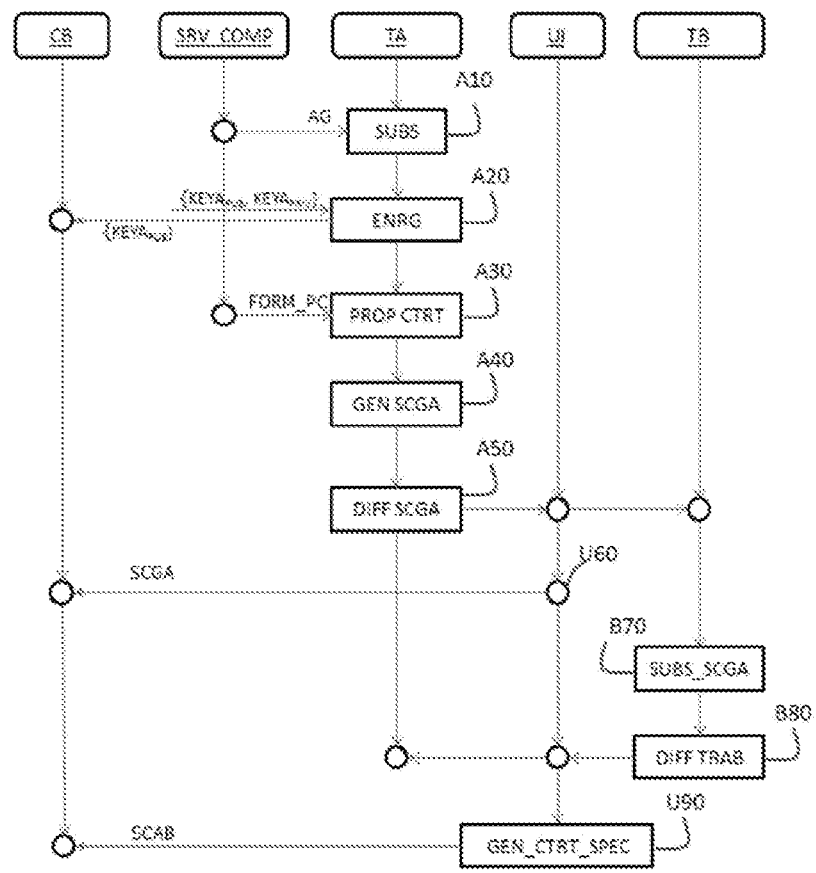
FIG. 3 illustrates, in the form of a flowchart, the main steps of the methods in accordance with one particular embodiment of the invention.

With reference to FIG. 3, there will now be described:
- the main steps A10 to A50 of a contract proposal broadcasting method according to the invention implemented by the terminal TA of Alice,
- the main steps B70 and B80 of a contract proposal acceptance method implemented by the terminal TB of Bob and by the terminal TC of Charly; and
- the main steps A10 to A50, U60, B70, B80 and U90 of a contract negotiation method implemented jointly by the terminal TA of Alice, the terminal TB of Bob or the terminal TC of Charly and the terminal U1 of a miner of the blockchain.

During a step A10, the user Alice (hereinafter Alice) uses her terminal TA to subscribe to the contract composition service from a server SRV_COMP. The terminal TA downloads the agent AG from the server SRV_COMP and installs this agent AG on the hard disk 15 of the device DA.

In the embodiment described here, this agent AG includes:
- a module AG_GENKEY for generating cryptographic keys;
- a cryptographic signature module AG_SIGN;
- a module AG_REDA for assistance in drafting contract proposals; and
- a module AG_DIFF configured to generate a smart contract from data received from the module AG_REDA and to broadcast the smart contract in the network in order to request its recording in a blockchain CB.

In the embodiment described here, when Alice installs the agent AG in her terminal TA, during a step A20, this agent AG:
- generates a pair of keys {KEYA$_{PUB}$ (public key), KEYA$_{PRIV}$ (private key)} for Alice by using her cryptographic key generation module AG_GENKEY;
- records the public key KEYA$_{PUB}$ of Alice in the blockchain CB;
- stores the pair of keys {KEYA$_{PUB}$, KEYA$_{PRIV}$} on the hard disk 15 of the device DA; and
- installs the module AG_REDA for assistance in drafting contract proposals as a plug-in of the browser NAV of the terminal TA.

In another embodiment, the cryptographic key generation module AG_GENKEY can be external to the agent, for example installed in a remote server. The pair of keys {KEYA$_{PUB}$, KEYA$_{PRIV}$} can be obtained by any means known in the state of the art.

It will be assumed that other users Bob and Charly, Ui$_{i=1,...N}$ have already be recorded in the blockchain CB during a registration phase and that their public keys KEYB$_{PUB}$, KEYC$_{PUB}$, KEYUi$_{PUB}$ are recorded in the blockchain CB.

During a step A30, Alice wishes to post a new contract proposal in the blockchain CB. For that, she uses the plug-in AG_REDA installed as a plug-in of her Internet browser NAV.

This plug-in downloads from the composition server SRV_COMP a Web page that constitutes a form FORM_PC for assistance in drafting a contract proposal and displays it in the browser NAV of Alice. This form FORM_PC is represented in FIG. 4.

In the embodiment described here, the form FORM_PC includes:
- a party A to be completed by the first party to the contract, here Alice, to propose a new contract, this party A including:
  - a field "Termes" to define the terms of the contract proposal,
  - a date field "Date" and a signature field "Sign" allowing the first party to the contract to date the contract proposal and to sign it with an electronic pen;
  - a validation button "OK" that can be used by the first party to the contract in order to request the recording of the contract proposal in the blockchain CB;
- a party B allowing defining the information to be provided by a second party to accept this contract proposal, some (marked with an asterisk) being optional. In the example described here, the second party B specified by Alice includes:
  - a field "Cond" in which the second party B can specify contract proposal acceptance conditions;
  - a date field "Date" and a signature field "Sign" allowing the second party to the contract to date the contract acceptance and to sign it with an electronic pen. Alice decides that these fields "Date" and "Sign" must necessarily be filled in.

It will be assumed that Alice:
- completes the field "Termes" with a service offer and an associated price, for example, "the company Alice is looking for a person to deliver pizzas in Paris, each delivery being paid for 10 euros";
- dates the contract proposal in the field "Date";
- signs the contract proposal with an electronic stylus in the field "Sign"; and
- validates her contract proposal to the contract by using the button "OK".

Figures 4, 5:
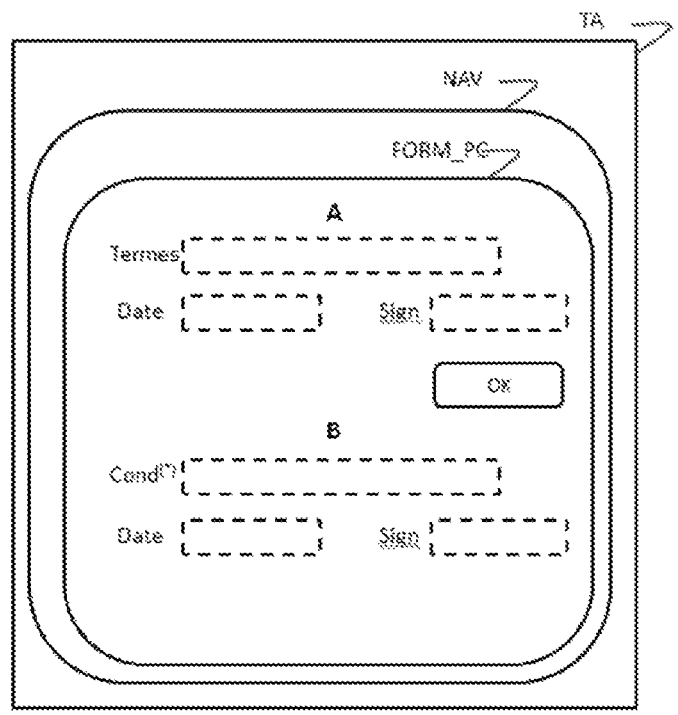
FIG. 4 represents a contract proposal drafting form that can be used in the invention.
FIG. 5 illustrates a smart contract that can be used in the invention.

This validation has the effect of generating, during a step A40, a smart contract SCGA represented in FIG. 5. This contract SCGA is an executable computer code which translates the contract proposal drafted by Alice by means of the form FORM_PC and which includes:
- the address @A of the register including the public key KEYA$_{PUB}$ of Alice in the blockchain CB;
- data TERMES, DATE, SIGN signed with the private key KEYA$_{PRIV}$ of Alice and which resumes the fields of the party A of the form FORM_PC completed by Alice;
- a subscription computer method SUBS_SCGA allowing a third party wishing to subscribe to the contract proposal, to broadcast a transaction in the network for this purpose; and
- a contract generation computer method GEN_CTRT_SPEC configured to generate a personalized contract between Alice and this third party and to request her recording in the blockchain CB.

The contract generation computer method GEN_CTRT_SPEC is further configured to verify a signature of said transaction by this third party.

During a step A50, the agent AG:
- signs the smart contract SCGA with the private key KEYA$_{PRIV}$ of Alice by using the module AG_SIGN; and
- broadcasts the smart contract SCGA signed in the blockchain CB by using the module AG_DIFF to request its recording in the blockchain.

In another embodiment, the form FORM_PC for assistance in drafting a contract proposal does not include the date "Date" and signature "Sign" fields, and the validation button OK is configured to automatically generate, when it is activated, a date and sign it, and to insert it into the smart contract SCGA.

In accordance with the blockchain technology, all the users of the chain, and in particular Alice, Bob, Charly, Ui receive this smart contract and can read it.

As the contract proposal SCGA has been signed with the private key of Alice, this contract proposal is, in the blockchain CB, the property of Alice. It will be noted that the agent AG is not authenticated in the blockchain CB.

It will be assumed that a user Ui plays the role of a miner in the blockchain CB, and that during a step U60, he verifies the signature of the smart contract SCGA with the public key of Alice KEYA$_{PUB}$, inserts the smart contract SCGA in an address block @SCGA in the blockchain CB and rebroadcasts the blockchain CB.

In accordance with the blockchain technology, all the users of the chain, and in particular Alice, Bob, Charly receive the new blockchain CB.

It will be assumed that Bob reads the contract proposal of Alice during a step B70 and decides to subscribe to it by invoking the subscription method SUBS_SCGA of the smart contract SCGA.

Figures 6, 7:
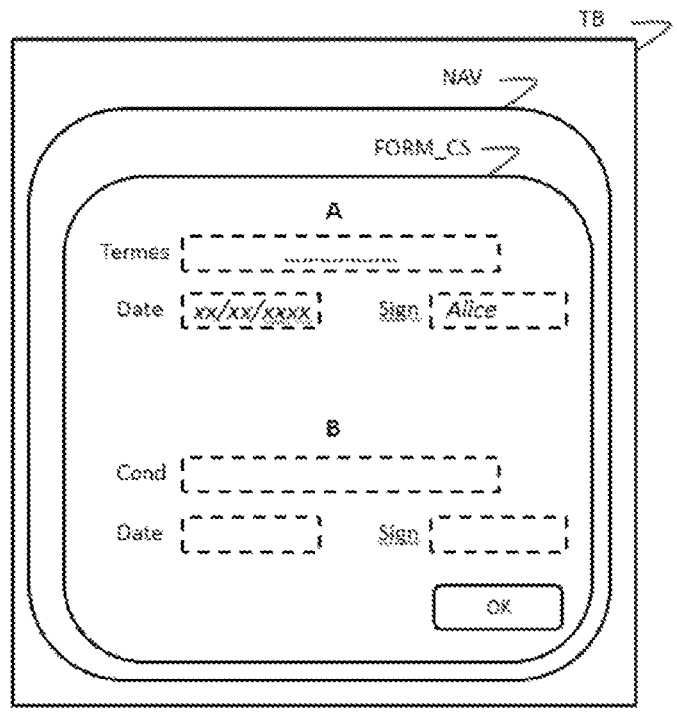
FIG. 6 represents a contract proposal acceptance drafting form that can be used in the invention.
FIG. 7 illustrates a transaction that can be used in the invention.

The execution of this method generates the display of a form FORM_CS in the browser NAV of the terminal TB of Bob represented in FIG. 6.

It includes, in this embodiment:
a party A reconstituted from the information provided by Alice and contained in the fields TERMES, DATE, SIGN of the smart contract SCGA;
a party B which resumes:
fields "Cond", "Date" and "Sign" as defined by Alice in her form FORM_PC and which can be edited by Bob to generate data representative of her willingness to accept the terms of the contract proposal, these data must include a date and a signature and possibly contract proposal acceptance conditions; and
a validation button OK usable by Bob to request the generation and the recording of a personalized contract SCAB between Alice and Bob in the blockchain CB.

The validation button OK can further be used by Bob to broadcast a transaction in order to subscribe to the contract proposal.

It will be assumed that Bob, during a step B80, sets his conditions in the field "Cond", dates, signs the form FORM_CS with an electronic stylus and validates his transaction request with the button "OK". This validation causes the broadcasting of a transaction TR_AB, signed with the private key KEYB$_{PRIV}$ of Bob to the users of the blockchain, including Alice, Charly and Ui.

In another embodiment, the form FORM_CS does not include the date "Date" and signature "Sign" fields, and the validation button OK is configured to automatically generate, when it is activated, a date, signs it and inserts it into the transaction TR_AB.

In another embodiment, the form FORM_CS does not include the date "Date" and signature "Sign" fields, and pressing the button "OK" only causes the broadcasting of the transaction TR_AB.

This transaction TR_AB transmitted in the blockchain CB includes the proof of Bob's willingness to execute, by a mining device, the method GEN_CTRT_SPEC of the smart contract SCGA in order to generate a personalized contract SCAB. This transaction TR_AB is represented in FIG. 7 and includes:

the address @B of the public key KEYB$_{PUB}$ of Bob in the blockchain CB;
the address @SCGA of the smart contract SCGA in the blockchain CB;
an identifier GEN_CTRT_SPEC of the method of this contract to be executed to generate a personalized contract SCAB;
fields COND, DATE and SIGN which resume the conditions, the date and the signature of Bob edited in the fields "Cond", "Date" and "Sign" of the form FORM_SC and which will be used as parameters to the method GEN_CTRT_SPEC in order to generate the personalized contract SCAB.

The identifier GEN_CTRT_SPEC of the method of the contract to be executed to generate a personalized contract SBAB is also used to verify a signature of said transaction (TR_AB) by the second party.

During a step U90, a user Ui who plays the role of a miner in the blockchain CB:
verifies the signature of the transaction TR_AB with the public key KEYB$_{PUB}$ of Bob;
executes, to generate the personalized contract SCAB, the method GEN_CTRT_SPEC of the smart contract SCGA by taking as parameters the data of the fields COND, DATE and SIGN of the transaction TR_AB;
inserts the personalized contract SCAB into an address register @SCAB of the blockchain CB; and
rebroadcasts the blockchain CB.

The verification of the signature of the transaction TR_AB is implemented by means of the execution of the method GEN_CTRT_SPEC. In other words, the method GEN_CTRT_SPEC is also executed to verify the signature of the transaction TR_AB with the public key KEYB$_{PUB}$ of Bob and record the generated personalized contract SCAB.

In accordance with the blockchain technology, all the users of the chain, and in particular Alice, Bob, Charly, receive the new blockchain CB; Alice can thus read the personalized contract SCAB concluded with Bob.

In the embodiment described here, the method GEN_CTRT_SPEC verifies that the conditions of the field COND set by Bob are acceptable before generating the personalized contract SCAB.

It is fundamental to note that the owner of the contract SCAB in the blockchain is the smart contract SCGA and not Bob. Particularly, the contract SCAB is not signed with the private key KEYB$_{PRIV}$ of Bob. The contract SCAB is finalized by the smart contract SCGA based on the specific conditions of Bob, but the terminal TB of Bob is not involved either for the generation of the personalized contract SCAB or for its recording in the blockchain. Those skilled in the art of the blockchains will understand that the smart contract SCGA can always be verified since it is recorded in the blockchain CB.

It will now be assumed that another user registered in the blockchain, for example Charly, decides, like Bob in step B70, to respond to the contract proposal of Alice by invoking the subscription method SUBS_SCGA of the smart contract SCGA.

The execution of this method then generates the display of the Web form FORM_CS in the browser of the terminal of Charly.

During a step similar to step B80 previously described, Charly can set his own acceptance conditions and broadcast a transaction TR_AC, signed with his private key KEYC$_{PRIV}$ to the users of the blockchain.

This transaction TR_AC is similar to the transaction TR_AB of Bob transaction. It includes:

the address @C of the public key KEYC$_{PUB}$ of Charly in the blockchain CB;

the address @SCGA of the smart contract SCGA in the blockchain CB;

the identifier GEN_CTRT_SPEC of the method of this contract to be executed in order to generate SCAC;

fields COND, DATE and SIGN which resume the conditions, the date and the signature of Charly edited in the fields "Cond", "Date" and "Sign" of the form FORM_SC and which must be used as parameters to the method GEN_CTRT_SPEC in order to generate a personalized contract SCAC between Alice and Charly.

The identifier GEN_CTRT_SPEC of the method of the contract to be executed is also used to verify the transaction and to record the generated contract SCAC.

Of course, if the terms of the contract proposal suit him as they are, Charly may not set any acceptance conditions.

During a step similar to step U90 already described, a user Ui playing the role of a miner in the blockchain CB:

verifies the signature of the transaction TR_AC with the public key KEYC$_{PUB}$ of Charly;

executes the method GEN_CTRT_SPEC of the smart contract SCGA with the data of the fields COND, DATE and SIGN of the transaction TR_AC;

inserts the personalized contract SCAC into an address register @SCAC of the blockchain CB; and rebroadcasts the blockchain CB.

In accordance with the blockchain technology, all the users of the chain, and in particular Alice, Bob, Charly receive the new blockchain CB; Alice can thus read the personalized contract SCAC concluded with Charly.

The owner of the contract SCAC in the blockchain is the smart contract SCGA and not Charly; the contract SCAC is not signed with the private key KEYC$_{PRIV}$ of Charly.

Figure 8:
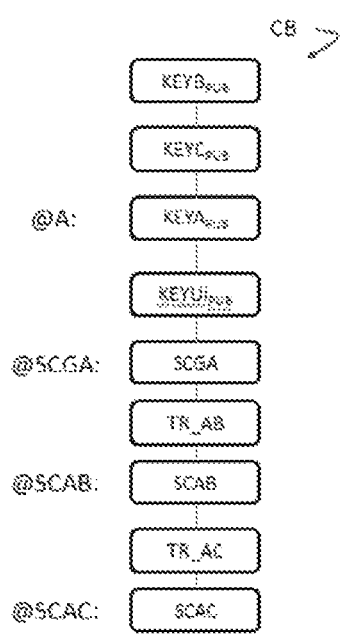
FIG. 8 represents a blockchain including blocks generated by the invention 8.

FIG. 8 represents the blockchain CB. It is fundamental to note that it includes:

the contract proposal SCGA of Alice;

the transactions TRA_AB and TR_AC;

two personalized contracts SCAB, SCAC generated by SCGA, and properties of SCGA.

A copy of this chain is stored by the terminals TA, TB, TC and Ui.

For example, @A is a pointer for finding the key KEYA$_{PUB}$ of Alice in the blockchain.

The invention claimed is:

1. A method for broadcasting, in a telecommunications network, a contract proposal proposed by a first party, the method comprising:

generating a smart contract, said smart contract including:

an address, in a blockchain, of a register, said register including a public key of said first party;

data representative of terms of said contract proposal;

a subscription method, said subscription method comprising code executable by a device of a second party, said code allowing said second party to broadcast a transaction in said network in order to subscribe to said contract proposal; and a contract generation method, said contract generation method comprising code executable by a device to:

generate a personalized contract between said first party and said second party, said personalized contract being generated from parameters comprised in said transaction and representative of a willingness of said second party to accept the terms of the contract proposal, and request the recording of said personalized contract in the blockchain;

signing said smart contract with a private key of said first party; and broadcasting in said network said signed smart contract to request its recording in the blockchain.

2. The method of claim 1, wherein said personalized contract is a smart contract.

3. The method of claim 1, wherein said subscription generation method further comprises code executable by the device of the second party to obtain conditions of accepting the contract proposal from said second party, said acceptance conditions forming part of the parameters comprised in said transaction used to generate said personalized contract.

4. The method of claim 1, further comprising downloading a computer agent from a server, the agent including:

a module for obtaining, from said first party, said data representative of the terms of said contract proposal; and a module for generating said smart contract from said data and for broadcasting said smart contract in said network, the method further comprising, after executing said module for obtaining said data representative of the terms of said contract proposal, generating said smart contract and broadcasting in said network said signed smart contract by executing said second module for generating said smart contract from said data and for broadcasting said smart contract in said network.

5. The method of claim 4, wherein the agent further includes a module for signing said smart contract with the private key of said first party, the method further comprising signing said smart contract with a private key of said first party by executing said module for signing said smart contract with the private key of said first party.

6. The method of claim 1, wherein the contract generation method comprises code configured to be executed by a blockchain mining device distinct from the terminal of the second party.

7. The method of claim 1, wherein the personalized contract generated by the execution of the contract generation method is recorded in the blockchain as the property of the smart contract.

8. A non-transitory computer-readable medium having stored thereon instructions which, when executed by a processor, cause the processor to implement the method of claim 1.

9. A method for accepting a contract proposal broadcast in a telecommunications network, the method being implemented by a terminal of a user and comprising:

obtaining a smart contract recorded in a blockchain, said smart contract including:

an address, in said blockchain, of a register, said register including a public key of a first party owner of said contract proposal;

data representative of terms of said contract proposal;

a subscription method, said subscription method comprising code executable by a device of a second party, said code allowing said second party to broadcast a transaction in said network in order to subscribe to said contract proposal;

a contract generation method, said contract generation method comprising code executable by a device to:

generate a personalized contract between said first party and said second party, said personalized contract being generated from parameters comprised in said transaction and representative of a willingness of said second party to accept the terms of the contract proposal, and request the recording of said personalized contract in the blockchain;

obtaining parameters representative of a willingness of said user to accept the terms of said contract proposal;

executing said subscription method, said execution triggering the broadcast in the network of a transaction, signed with a private key of said user and including:

the address of a public key of said user in the blockchain;

the address of said smart contract in the blockchain;

an identifier of said contract generation method; and said parameters representative of a willingness of said user to accept the terms of said contract proposal.

10. A non-transitory computer-readable medium having stored thereon instructions which, when executed by a processor, cause the processor to implement the method of claim 9.

11. A device for broadcasting, in a telecommunications network, a contract proposal proposed by a first party, this device comprising a processor, the device configured to:

generate a smart contract, said smart contract including:

an address, in a blockchain, of a register, said register including a public key of said first party;

data representative of terms of said contract proposal;

a subscription method, said subscription method comprising code executable by a device of a second party, said code allowing said second party to broadcast a transaction in said network in order to subscribe to said contract proposal;

a contract generation method, said contract generation method comprising code executable by a device to:

generate a personalized contract between said first party and said second party, said personalized contract being generated from parameters comprised in said transaction and representative of a willingness of said second party to accept the terms of the contract proposal, and request the recording of said personalized contract in the blockchain;

sign said smart contract with a private key of said first party; and broadcast in said network said signed smart contract to request its recording in the blockchain.

12. The device of claim 11, further configured to:

download an agent from a server; and install said agent in said device;

said agent enabling the device to generate the smart contract, sign the smart contract, and broadcast the signed smart contract.

13. A device for accepting a contract proposal broadcast in a telecommunications network, the device implemented in a terminal of a user and configured to:

obtain a smart contract recorded in a blockchain, said smart contract including:

an address, in said blockchain, of a register, said register including a public key of a first party owner of said contract proposal;

data representative of terms of said contract proposal;

a subscription method, said subscription method comprising code executable by a device of a second party, said code allowing said second party to broadcast a transaction in said network in order to subscribe to said contract proposal;

a contract generation method, said contract generation method comprising code executable by a device to:

generate a personalized contract between said first party and said second party, said personalized contract being generated from parameters comprised in said transaction and representative of a willingness of said second party to accept the terms of the contract proposal, and request the recording of said personalized contract in the blockchain;

obtain parameters representative of a willingness of said user to accept the terms of said contract proposal;

execute said subscription method, said execution triggering the broadcast in the network of a transaction, signed with a private key of said user and including:

the address of a public key of said user in the blockchain;

the address of said smart contract in the blockchain (CB);

an identifier of said contract generation method; and said parameters representative of a willingness of said user to accept the terms of said contract proposal.

14. A method for negotiating a contract between two parties in a telecommunications network, said method including:

generating a contract proposal by said first party, in the form of a smart contract including:

an address, in a blockchain, of a register, said register including a public key of said first party;

data representative of terms of said contract proposal;

a subscription method, said subscription method comprising code executable by a device of a second party, said code allowing the second party to broadcast a transaction in said network in order to subscribe to said contract proposal;

a contract generation method, said contract generation method comprising code executable by a device to:

generate a personalized contract between said first party and said second party, said personalized contract being generated from parameters comprised in said transaction and representative of a willingness of said second party to accept the terms of the contract proposal, and Ma request the recording of said personalized contract in the blockchain;

signing said smart contract with a private key of said first party;

broadcasting said signed smart contract in said network to request its recording in the blockchain;

obtaining said smart contract by the second party;

obtaining parameters representative of a willingness of said second party to accept the terms of said contract proposal;

executing said subscription method by a terminal of said second party, said execution triggering the broadcast in the network of a transaction, signed with a private key of said second party and including:

the address of a public key of said user in the blockchain;

the address of said smart contract in the blockchain;

an identifier of said contract generation method; and said parameters representative of a willingness of said second party to accept the terms of said contract proposal;

executing, by a blockchain mining device, said personalized contract generation method, using said parameters representative of a willingness of said second party to accept the terms of said contract proposal, to generate a personalized contract between said parties, to record it in the blockchain, and to rebroadcast the blockchain.

\* \* \* \* \*